US011113462B2

(12) United States Patent
Viswanathan

(10) Patent No.: US 11,113,462 B2
(45) Date of Patent: Sep. 7, 2021

(54) SYSTEM AND METHOD FOR CREATING AND SHARING INTERACTIVE CONTENT RAPIDLY ANYWHERE AND ANYTIME

(71) Applicants: Maruthi Viswanathan, Bangalore (IN); RXPRISM HEALTH SYSTEMS PRIVATE LTD, Bangalore (IN)

(72) Inventor: Maruthi Viswanathan, Bangalore (IN)

(73) Assignee: RXPRISM HEALTH SYSTEMS PRIVATE LTD, Bangalore (IN)

( * ) Notice: Subject to any disclaimer, the term of this patent is extended or adjusted under 35 U.S.C. 154(b) by 0 days.

(21) Appl. No.: 16/865,592

(22) Filed: May 4, 2020

(65) Prior Publication Data

US 2020/0387663 A1    Dec. 10, 2020

Related U.S. Application Data

(63) Continuation-in-part of application No. 16/721,384, filed on Dec. 19, 2019.

(30) Foreign Application Priority Data

Dec. 19, 2018 (IN) .............................. 201841048222

(51) Int. Cl.
*G06F 40/166* (2020.01)
*G06F 40/134* (2020.01)

(52) U.S. Cl.
CPC .......... *G06F 40/166* (2020.01); *G06F 40/134* (2020.01)

(58) Field of Classification Search
CPC ............................ G06F 40/134; G06F 40/166
USPC ......................................................... 725/136
See application file for complete search history.

(56) References Cited

U.S. PATENT DOCUMENTS

| 2017/0039867 A1* | 2/2017 | Fieldman | G11B 27/031 |
| 2019/0068670 A1* | 2/2019 | Adam | H04L 65/403 |
| 2021/0174693 A1* | 6/2021 | Nagler | H04L 51/32 |

* cited by examiner

*Primary Examiner* — Dominic D Saltarelli
(74) *Attorney, Agent, or Firm* — Hill Wallack LLP; Jason L DeFrancesco

(57) ABSTRACT

The present invention relates to a method (1200) for creating and sharing Interactive content (1165). The invention facilitates providing (1202) first media (1161) and/or text content as speaker notes in one or multiple languages to first user (102). A second media (1162) is provided (1204) by first user (102) using First Media (1161) and/or text content. The first media (1161) and/or second media (1162) are processed (1206) to generate an interactive content (1165). The interactive content (1165) is stored as a network based resource. The stored interactive content (1165) is then enabled to be shared (1208).

11 Claims, 15 Drawing Sheets

SYSTEM AND METHOD FOR CREATING AND SHARING INTERACTIVE CONTENT RAPIDLY ANYWHERE AND ANYTIME

CROSS-REFERENCE TO RELATED APPLICATIONS

This application is a continuation-in-part of U.S. patent application Ser. No. 16/721,384 filed on Dec. 19, 2019, the entire disclosure of which is expressly incorporated herein by reference.

TECHNICAL FIELD

Embodiments of the present invention relate generally to generation, presentation and broadcasting of media content and more particularly to a system and a method for creating and sharing content rapidly anywhere and anytime.

BACKGROUND ART

"Show and Tell" is a common practice in elementary schools. "Show and tell" is the practice of showing something to an audience and telling about them. It is a common classroom activity at early elementary school. It is practiced to teach young children the skills of public speaking and art of explaining/narrating a story about the object what they are showing. For Eg: A child will bring an item from home and will explain to the class why they chose that particular item, where they got it, and other relevant information.

There is a lot more to learn from this method for adults. Through "Show and Tell" method of communication one can share ideas, demonstrate, educate, provide feedbacks effectively with better clarity. It creates enthusiasm, provides meaning, stokes innovation, and promotes team spirit, sense of pride. It is important that when the social media and digital content are taking a huge leap, how one can apply this "Show and Tell" practice in this digital world through online.

On other hand online platforms like social commerce which enables users to become resellers by allowing them to share the product details like product images and text description of the product with their friends and families through chat and social media platforms. This enables the resellers to pick order and sell the products provided by social commerce platforms to their social contacts. But just sharing the photos of the product and product description as text is NOT good enough to gain confidence among the social contact and convert into sales. Resellers should make attempt to describe the products as best as possible to educate the potential customers as per their sales skills and product knowledge. People don't prefer to read the text information rather they like to hear or watch. Social commerce platform fail to provide tools and interfaces where Resellers create and share interesting content to their social contacts by showing the product images and explain them about various features of the product through video or audio recording in their natural language. Thus, reseller miss an opportunity to build trust and confidence among their social contacts/customers and not performing in terms of sales to their full potential.

E-commerce platform's affiliate program are based on affiliate marketing which enable any affiliates to sell the listed products through various marketing activities of their own. These e-commerce platforms provides product details through a web content URL which can be shared by affiliates with other during their marketing activity to drive sales for the merchant. But providing web URL, product images and text description are NOT just good enough for the affiliates to succeed in marketing the product.

E-commerce platform fail to empower affiliates by providing digital tools which enables them to show the product images and explain them to educate customers in their own language naturally along with necessary call to action to take the potential customer to order page.

Also, E-commerce platform provides product listing interface to all merchants to add photos, videos and text description of any product they would like to list and sell online. However, these e-commerce platforms fail to provide an authoring tool which enable merchants to show the product images and describe about them through video or audio recording of their own sales people similar to how one would greet and explain about the product when customer visits a retail showroom. These platforms fail to provide natural shopping experience to the customers.

Professional network platforms enable users to send messages/email through text and with or without any presentation as an attachment among user contacts within the platform, many times these messages are goes unread and the sent presentation never seen. Because People prefer watching over reading. People hate reading long text message or emails. These platforms fail to provide tools to enable users to share self-made content like showing their slide content and explaining them through their own short video or audio recording on top of the slide content, this would enable people improve the message access rate, build trust and communicate faster with clarity.

Customer Relationship Management (CRM) platform provides communication interfaces and options to users to contact their potential customers through email, short message text, telephone call etc. The message open rate is very low as people don't prefer to read cold & long emails. Also, these platforms fail to provide an intuitive tool to users to Show their presentation slides or product images and describe them through quick video or audio recording on top of the slide content or images, and share it as multimedia content to their potential customers. This would help them to build trust and confidence with potential customers before they make purchase decision.

Online content generation platform like blog web sites, news websites, informative websites etc provides tools to users and authors to create text article with images and text. But with the changing audience interest towards videos and preference to watching the content over reading long text articles, these platforms fail to provide new authoring tool which enables authors to rapidly create their content through showing images and describing them through their own video or audio recordings. This would enable new method of rapid content creation through video or audio.

In all above described shortfalls, one could create professional video to overcome these challenges and communicate better but, creating a product video or video presentation is a time consuming and costly production process. It is not practically easy to create video communication for all communication messages to make it personalized.

Hence, there is a huge need of such system and a method for creating and sharing content rapidly anywhere and anytime thorough SHOW & TELL communication principles by showing images/visual content and explaining them through an audio or video recording to overcome such problems described above.

OBJECT OF THE INVENTION

An aspect of the present invention provides a method for creating and sharing interactive content rapidly anywhere and anytime.

SUMMARY OF THE PRESENT INVENTION

The present invention is described hereinafter by various embodiments. This invention may, however, be embodied in many different forms and should not be construed as limited to the embodiment set forth herein. Rather, the embodiment is provided so that this disclosure will be thorough and complete and will fully convey the scope of the invention to those skilled in the art.

According to first aspect of the present invention, a method for creating and sharing Interactive content is provided. The method comprises the steps of providing a first media and/or text content as speaker notes in one or multiple languages to a first user, providing second media by the first user using first Media and/or text content, processing first media and/or second media and storing an interactive content as network based resource, and sharing the stored interactive content. In an aspect, the first media is images, photos, videos, audio, videos with audio, text, text animations, animated graphics, interactive animation, interactive poll questions.

In accordance with an embodiment of the present invention, the step of providing a second media further comprises the step of recording second media by first user using first media and/or text content. In an aspect, the second media is video, video with audio, audio only.

In accordance with another embodiment of the present invention, the step of providing a second media further comprises the step of recording second media by first user using first media and/or text content as voice narration script.

In accordance with another embodiment of the present invention, the step of processing first media and/or second media further comprises the step of adding a call-to-action button within the interactive content with hyperlink to any online resource or web content or application.

In accordance with another embodiment of the present invention, the step of processing first media and/or second media further comprises the step of combining or merging both first media and second media.

In accordance with another embodiment of the present invention, the step of processing first media and/or second media further comprises the steps of transcoding and/or encoding and/or processing first media and/or second media, in multiple media formats and resolutions.

In accordance with another embodiment of the present invention, the step of processing first media and/or second media further comprises the steps of generating the interactive content access URL, and receiving the interactive content access URL by first users.

In accordance with another embodiment of the present invention, the step of sharing the interactive content further comprises the step of posting the Interactive content and/or interactive content URL on any online platform and/or sharing over network-based communication platform or apps.

In accordance with another embodiment of the present invention, the step of sharing the interactive content further comprises the step of sharing further comprises the step of sharing Interactive content with a second user.

In accordance with yet another embodiment of the present invention, the step of sharing the interactive content further comprises the steps of sharing interactive content with a second user and loading and playing the interactive content on second user devices by second user.

In accordance with yet another embodiment of the present invention, the step of loading and playing the interactive content further comprising the steps of displaying a call-to-action button of the associated interactive content on second user devices, and accessing the call-to-action button through the second user's haptic interaction to trigger the associated configured action to access external web URL or open and access another application or to view an online payment page or online order placement page or e-commerce product listing page or enable telephone call or network-based communication or text chat or video and audio call with one or more first user or other customer service professional or third party individual.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE DRAWINGS

Figure 1A:
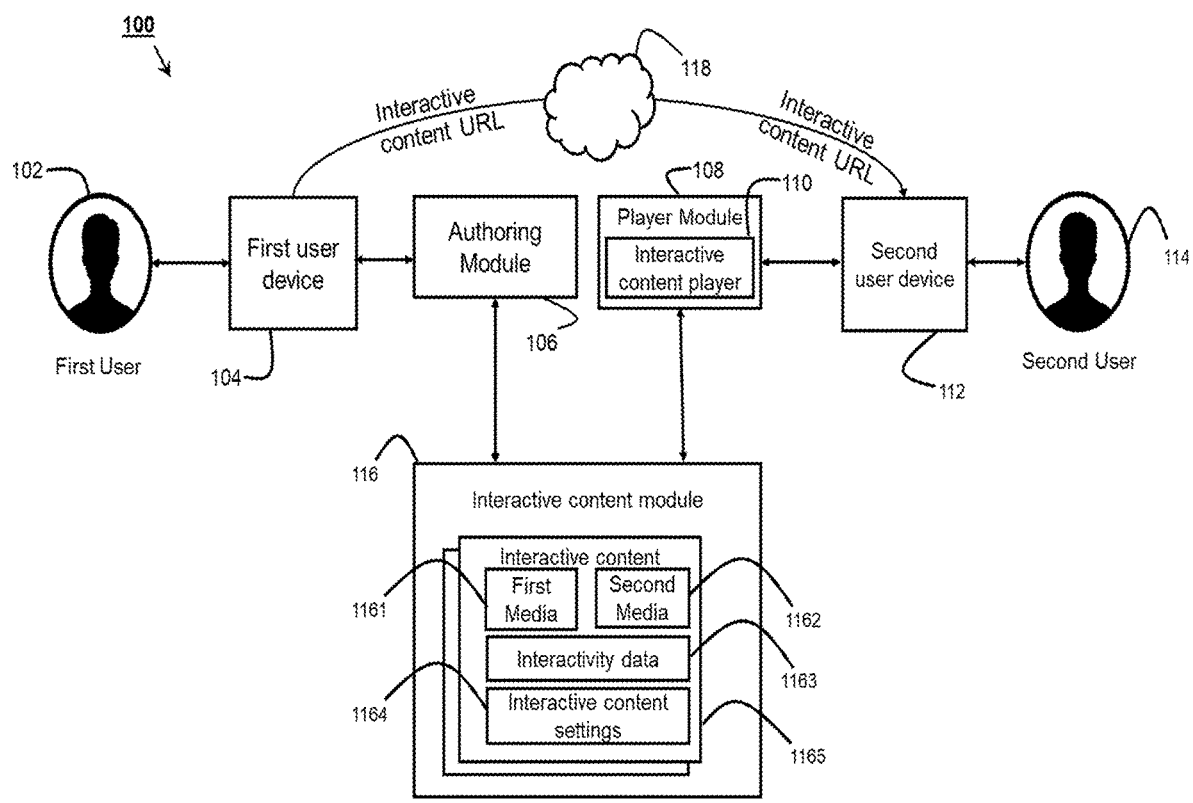
FIG. 1A illustrates a system for creating, sharing and viewing interactive content, in accordance with an embodiment of the present invention.

The present invention is described hereinafter by various embodiments with reference to the accompanying drawing, wherein reference numerals used in the accompanying drawing correspond to the like elements throughout the description.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" be used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Further, the various embodiments described herein below include specific method steps in an exemplary order, but a wide variety of other such method steps could be implemented within the scope of the invention, including additional steps, omission of some steps, or performing the method in a different order.

As shown in FIG. 1A, a system (100) for creating, sharing and viewing interactive content (1165) is provided. The system (100) may comprise one or more first user devices (104), one or more second user devices (112), an authoring module (106), an interactive content module (116), a player module (108) and a communication module. As shown in FIG. 1, the one or more first user devices (104) associated with one or more first users (102). Each of the one or more first user devices (104) are a computing device or a smart phone or a portable device. Each of the one or more second user devices (112) are a computing device or a smart phone or a portable device. In accordance with an exemplary embodiment of the present invention, the first users devices (104) and the second set of user devices (112) may be computing devices with at least a processor, a memory and a display such as, but not limited to, smartphone, a tablet, a desktop PC or laptop computing devices.

Further, the first user (102) may be a registered or anonymous user of an online platform or e-commerce platform or social commerce platform or social selling platform or closed loop marketing platform or customer relationship management platform or online content generation platform or social network platform or professional network platform or social communication platform.

The one or more second user devices (112) may be associated with the one or more second users (114). The second user (114) may be a registered or anonymous user of an online platform or e-commerce platform or social commerce platform or social selling platform or closed loop marketing platform or customer relationship management platform or online content generation platform or social network member or professional network member associated with first user (102) of any professional or any social network or social communication profile account.

The authoring module (106) is envisaged to include computing capabilities such as a memory unit (not shown) configured to store machine readable instructions. The machine-readable instructions may be loaded into the memory unit from a non-transitory machine-readable medium such as, but not limited to, CD-ROMs, DVD-ROMs and Flash Drives. Alternately, the machine-readable instructions may be loaded in a form of a computer software program into the memory unit. The memory unit in that manner may be selected from a group comprising EPROM, EEPROM and Flash memory.

Further, the authoring module (106) includes a processor or plurality of high-speed computing processors with multiple cores (not shown) operably connected with the memory unit. In various embodiments, the processor is one of, but not limited to, a general-purpose processor, an application specific integrated circuit (ASIC) and a field-programmable gate array (FPGA).

Further, the authoring module (106) coupled with the one or more first user devices (104) enabling creation of the interactive content (1165). The authoring module (106) may have a media recorder (206), a first media holder (202), a second media holder (204), an interactivity recorder and a configuration interface (412). In accordance with an embodiment of the present invention, the authoring module (106) is configured with the one or more first user device's (104) camera hardware, microphone, media library stored locally or in remote location associated with the one or more first user's account. Further, the media recorder (206) is configured to add or capture the one or more first media (1161) and/or record one or more second media (1162) in plurality of segments. The one or more first media (1161) may be images, photos, videos, audio, videos with audio, text, text animations, animated graphics, interactive animation, interactive poll questions. one or more second media (1162) is video, video with audio, audio only.

The authoring module (106) further comprises one or multiple text box user interface with input and/or output display for first user (102) to utilize as a speaker notes while recording second media (1162) by entering & reading the text or reading the provided text relevant to first media (1161) within text box user interface. Further, the authoring module (106) may be configured with the one or more first user device's (104) camera hardware, microphone, media library stored locally or in remote location associated with the one or more first user's account.

Additionally, the player module (108) is also envisaged to include computing capabilities such as a memory unit (not shown) configured to store machine readable instructions. The machine-readable instructions may be loaded into the memory unit from a non-transitory machine-readable medium such as, but not limited to, CD-ROMs, DVD-ROMs and Flash Drives. Alternately, the machine-readable instructions may be loaded in a form of a computer software program into the memory unit. The memory unit in that manner may be selected from a group comprising EPROM, EEPROM and Flash memory.

Further, the player module (108) includes a processor or plurality of high-speed computing processors with multiple cores (not shown) operably connected with the memory unit and data storage unit. In various embodiments, the processor is one of, but not limited to, a general-purpose processor, an application specific integrated circuit (ASIC) and a field-programmable gate array (FPGA).

Figure 7A:
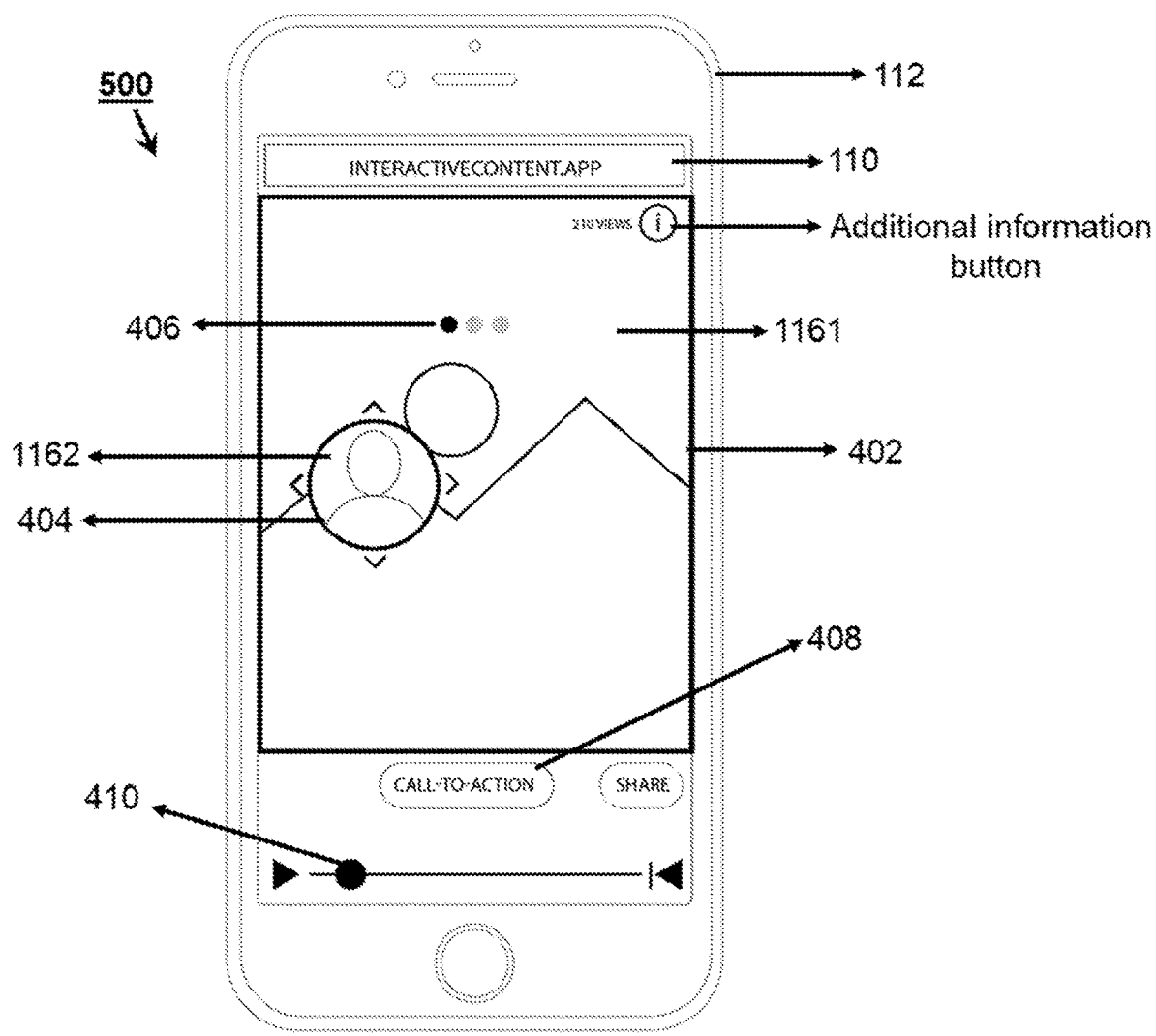
FIG. 7B illustrates an exemplary embodiment of a second user device, in accordance with an embodiment of the present invention.
Figure 7B:
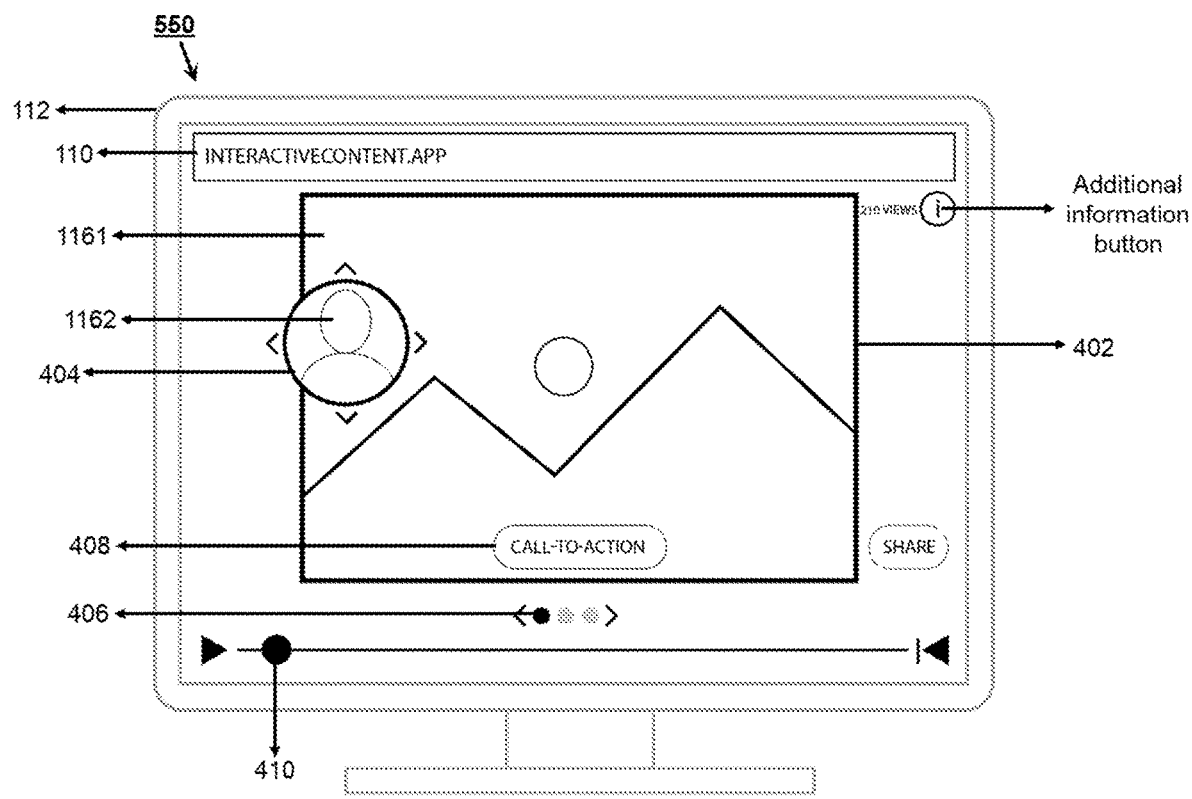

Furthermore, the player module (108) may be coupled with the one or more second user devices (112). In accordance with an embodiment of the present invention, as shown in FIG. 7A & FIG. 7B, the player module (108) has an interactive content player (110) which is having a first media container (402), a second media container (404), an interactive timeline interface (410), an interface to display additional information and a call-to-action user interface (408). In accordance with an embodiment of the present invention, the interactive content player (110) is a multimedia player.

Additionally, the interactive content module (116) is also envisaged to include computing capabilities such as a memory unit (not shown) configured to store machine readable instructions. The machine-readable instructions may be loaded into the memory unit from a non-transitory machine-readable medium such as, but not limited to, CD-ROMs, DVD-ROMs and Flash Drives. Alternately, the machine-readable instructions may be loaded in a form of a computer software program into the memory unit. The memory unit in that manner may be selected from a group comprising EPROM, EEPROM and Flash memory.

Further, the interactive content module (116) includes a processor or plurality of high-speed computing processors with multiple cores (not shown) operably connected with the memory unit and data storage unit. In various embodiments, the processor is one of, but not limited to, a general-purpose purpose processor, an application specific integrated circuit (ASIC) and a field-programmable gate array (FPGA).

Furthermore, the communication module (not shown) is configured to establish communication between the one or more first user devices (104), the one or more second user devices (112), the authoring module (106), the interactive content module (116), the player module (108) through the communication network (118). The communication network (118) may be one of, but not limited to, wired network or wireless network or a Local Area Network (LAN) or a Wide Area Network (WAN). The communication network (118) may be implemented using a number of protocols, such as but not limited to, TCP/IP, 3GPP, 3GPP2, LTE, IEEE 802.x, HTTP, HTTPS, UDP, RTMP etc. One would appreciate that the communication network (118) can be a short-range communication network (118) and/or a long-range communication network (118), wired or wireless communication network (118). Preferably the communication network (118) is internet.

Figure 1B:
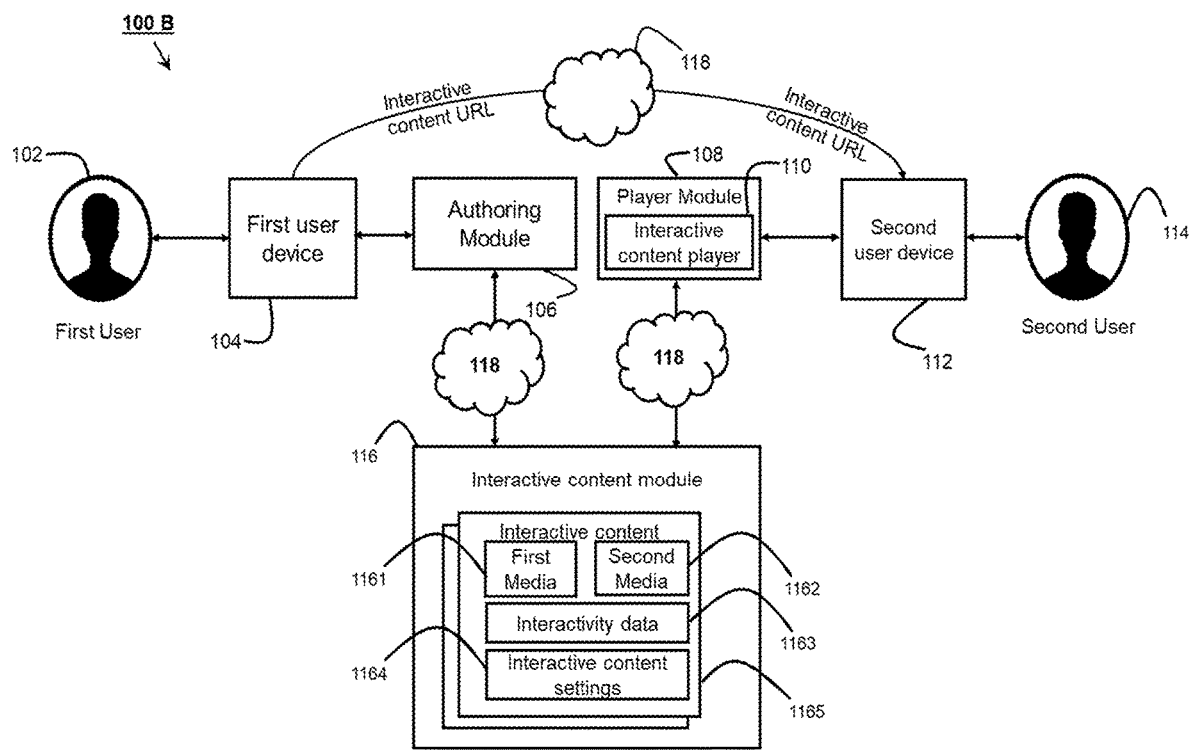
FIG. 1B illustrates an embodiment of the system connecting and computing data amongst first user device, the authoring module, a second user device and player module with the remote interactive content module over communication network, in accordance with an embodiment of the present invention.
Figure 1C:
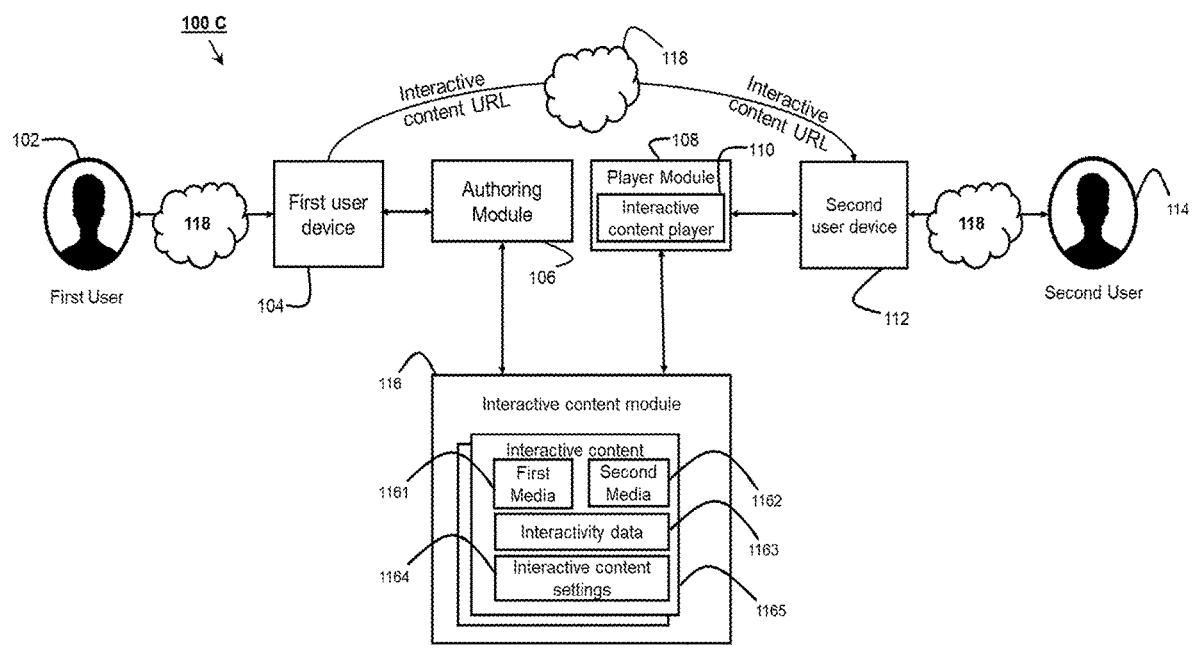
FIG. 1C illustrates an embodiment of the system connecting and computing data amongst first user device and a second user device with the remote authoring module, the remote player module and remote interactive content module over communication network, in accordance with an embodiment of the present invention.

FIG. 1B illustrates an embodiment of the system (100) connecting and computing data amongst First user device (104) and an authoring module (106) with a remote interactive content module (116) over communication network (118). Second user device (112) and a player module (108) communicates, retrieve and store data from a remote interactive content module (116) over communication network (118). Further, FIG. 1C illustrates an embodiment of the system (100) connecting and computing data amongst First user device (104) with a remote authoring module (106) and a remote interactive content module (116) over communication network (118). Second user device (112) communicates, retrieve and store data from a remote player module (108) and a remote interactive content module (116) over communication network(118).

Figure 1D:
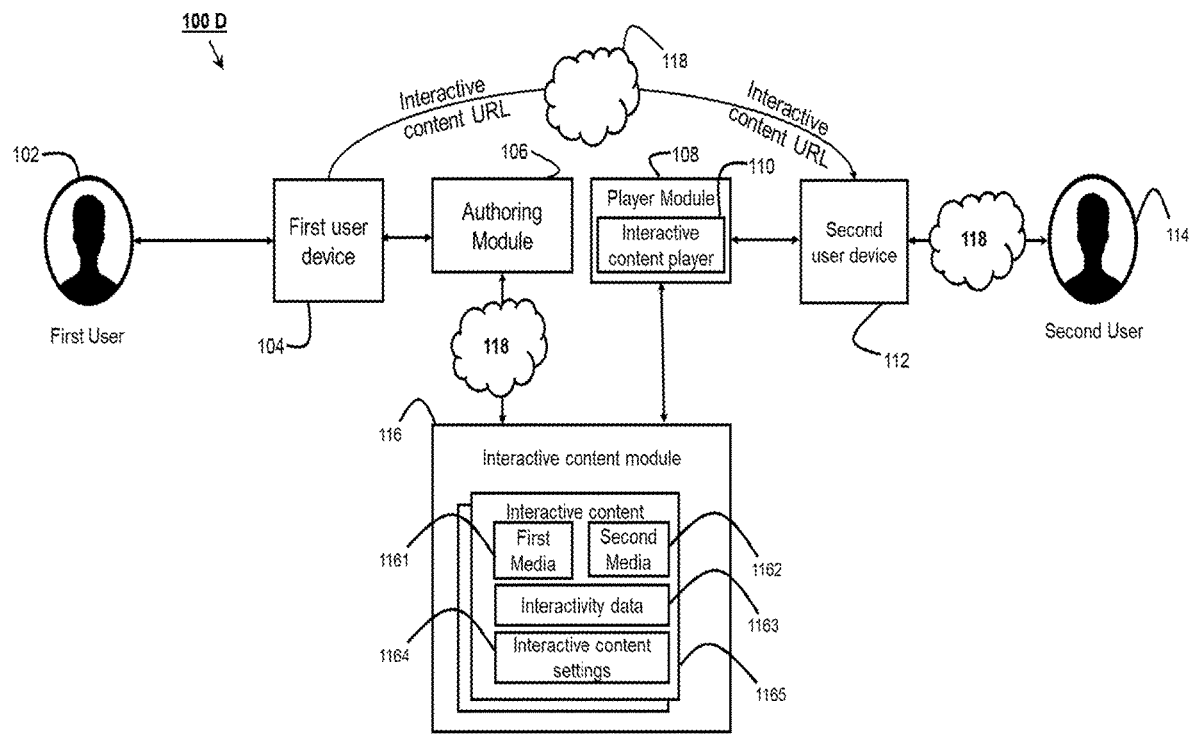
FIG. 1D illustrates an embodiment of the system connecting and computing data amongst first user device, the authoring module and a second user device with the remote player module and remote interactive content module over communication network, in accordance with an embodiment of the present invention.
Figure 1E:
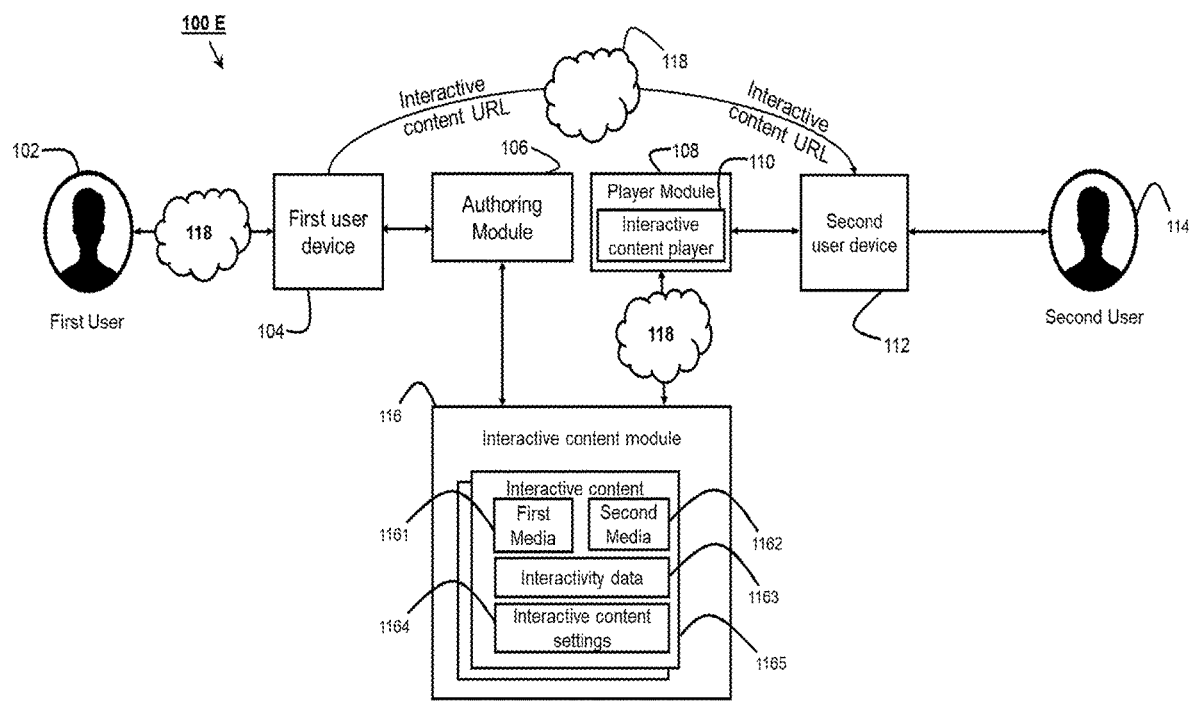
FIG. 1E illustrates an embodiment of the system connecting and computing data amongst first user device, second user device and the player module with the remote authoring module, and remote interactive content module over communication network in accordance with an embodiment of the present invention.

FIG. 1D illustrates an embodiment of the system (100) connecting and computing data amongst First user device (104) and authoring module (106) with a remote interactive content module (116) over communication network (118). Second user device (112) communicates, retrieve and store data from a remote player module (108) and a remote interactive content module (116) over communication network (118). FIG. 1E illustrates an embodiment of the system (100) connecting and computing data amongst First user device (104) with a remote authoring module (106) and a remote interactive content module (116) over communication network (118). Second user device (112) and a player module (108) communicates, retrieve and store data from a remote interactive content module (116) over communication network(118).

Figure 2:
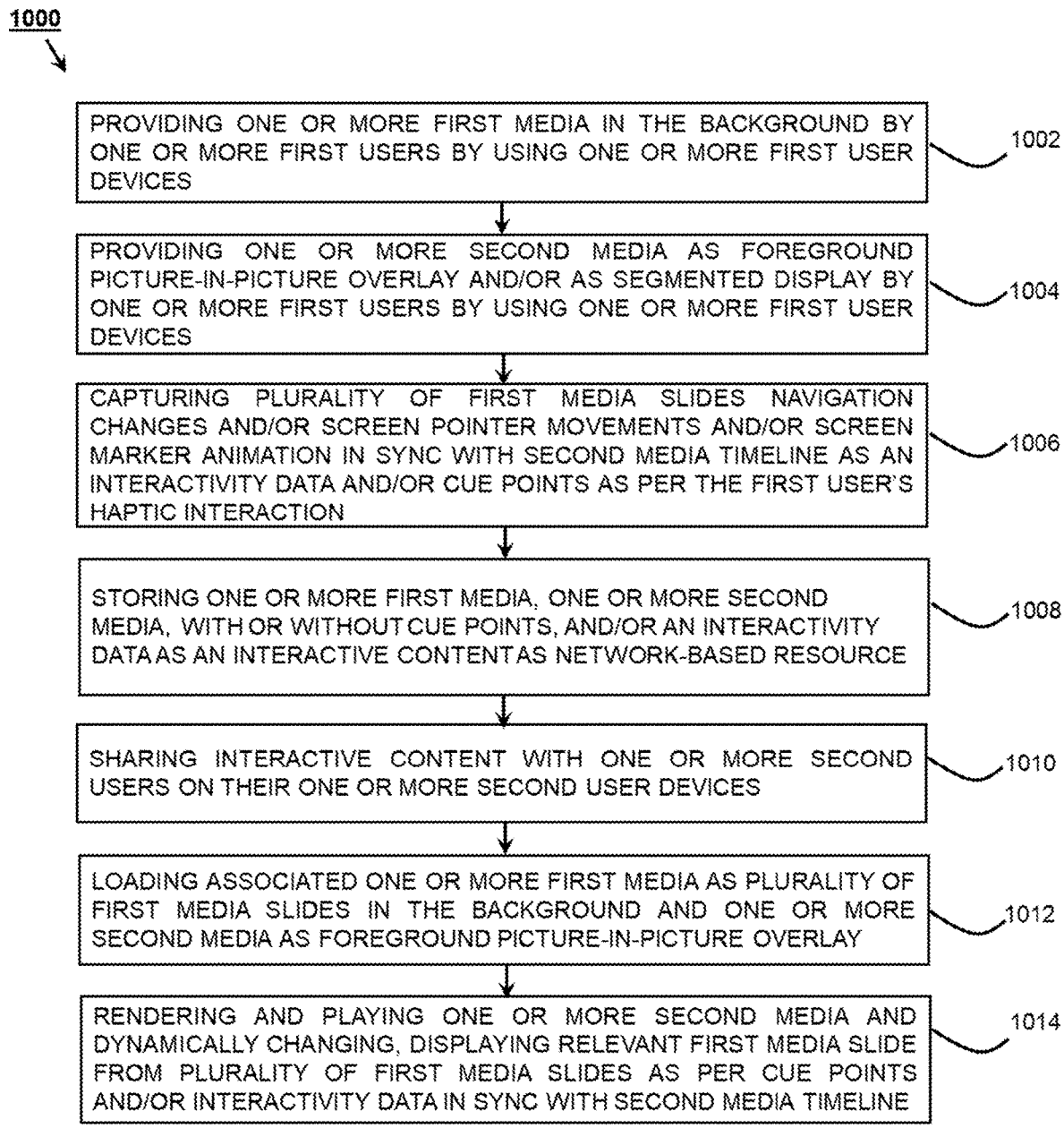
FIG. 2 illustrates a method for creating, sharing and viewing interactive content, in accordance with an embodiment of the present invention.
Figure 3:
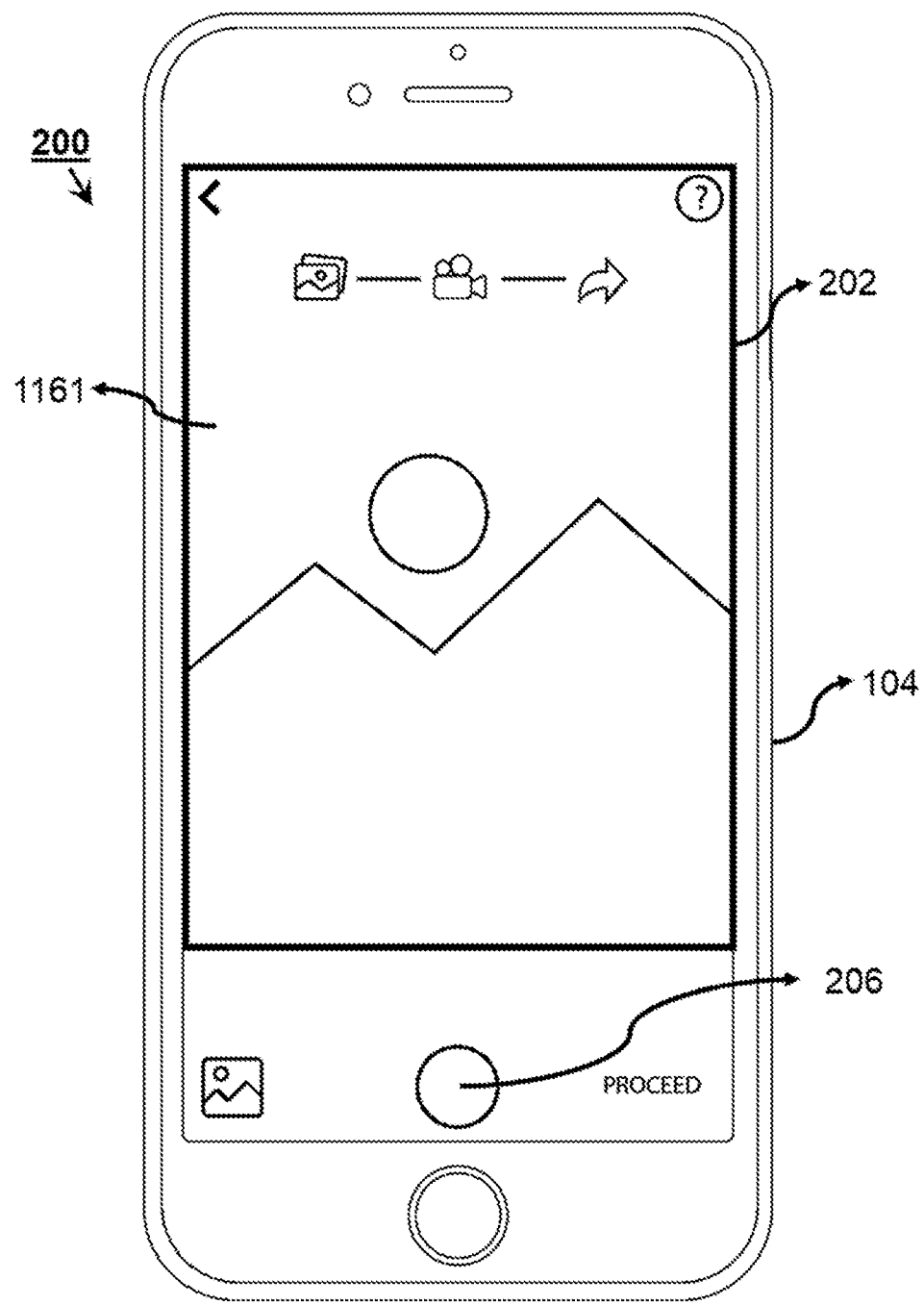
FIG. 3 illustrates a first user device with a first media, in accordance with an embodiment of the present invention.

FIG. 2 illustrates a method (1000) for creating, sharing and viewing interactive content (1165). As shown on FIG. 2, at step 1002, the one or more first user devices (104) may be configured to provide one or more first media (1161) in the background by one or more first users (102). FIG. 3 illustrates the first user device (104) with the first media (1161), in accordance with an embodiment of the present invention. As shown in FIG. 3, the one or more first user devices (104) may be configured to capture one or more first media (1161) with/without camera and microphone of the one or more first user devices (104) as a plurality of first media (1161) slides in the background by one or more first users (102). The first media (1161) provided by the first user (102) is displayed in the background on the first user devices (104). Further, the one or more first user devices (104) may be configured to add one or more first media (1161) from local or remote media library as a plurality of first media (1161) slides in the background by one or more first users (102). Further, as shown in 3, the first media holder (202) is an interactive user interface to load one or more first media (1161) as the plurality of first media (1161) slides and render or display one or more plurality of first media (1161) slides in the one or more first user devices (104).

Figure 4A:
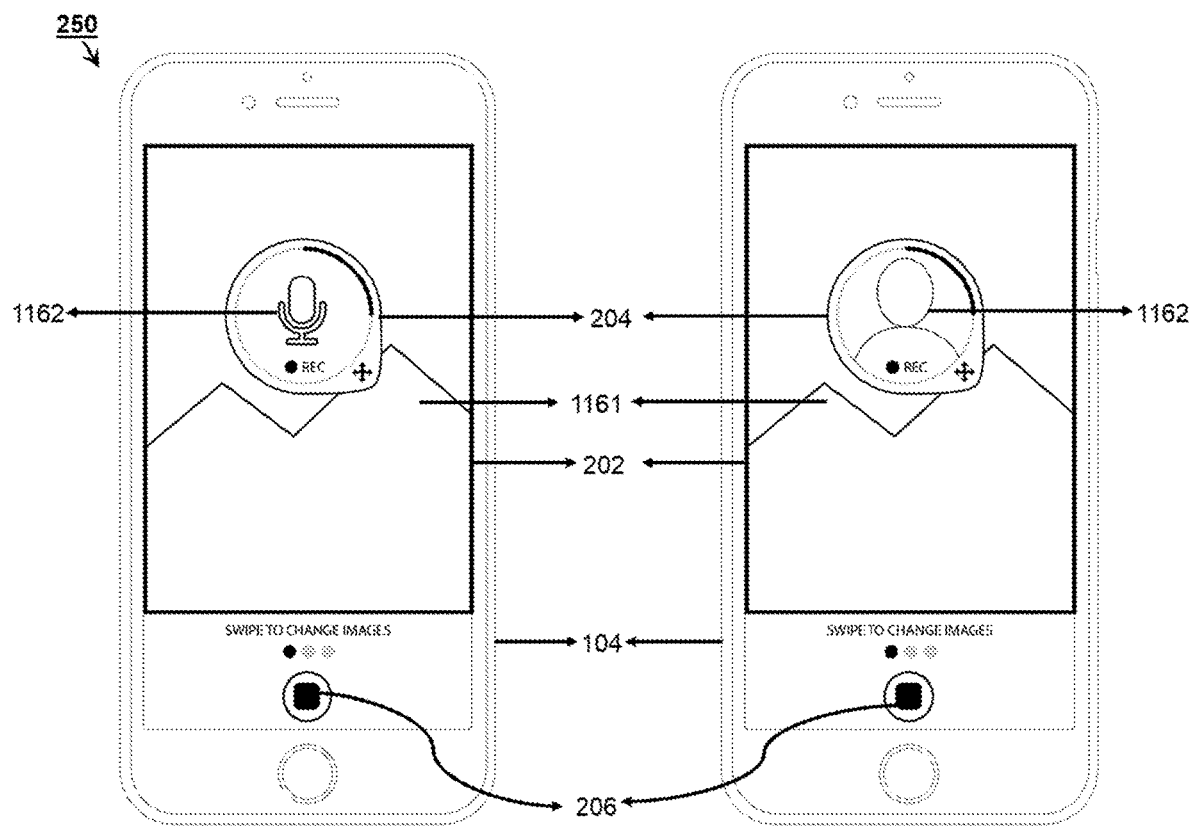
FIG. 4A and FIG. 4B illustrates the first user devices with a second media, in accordance with an embodiment of the present invention.
Figure 4B:
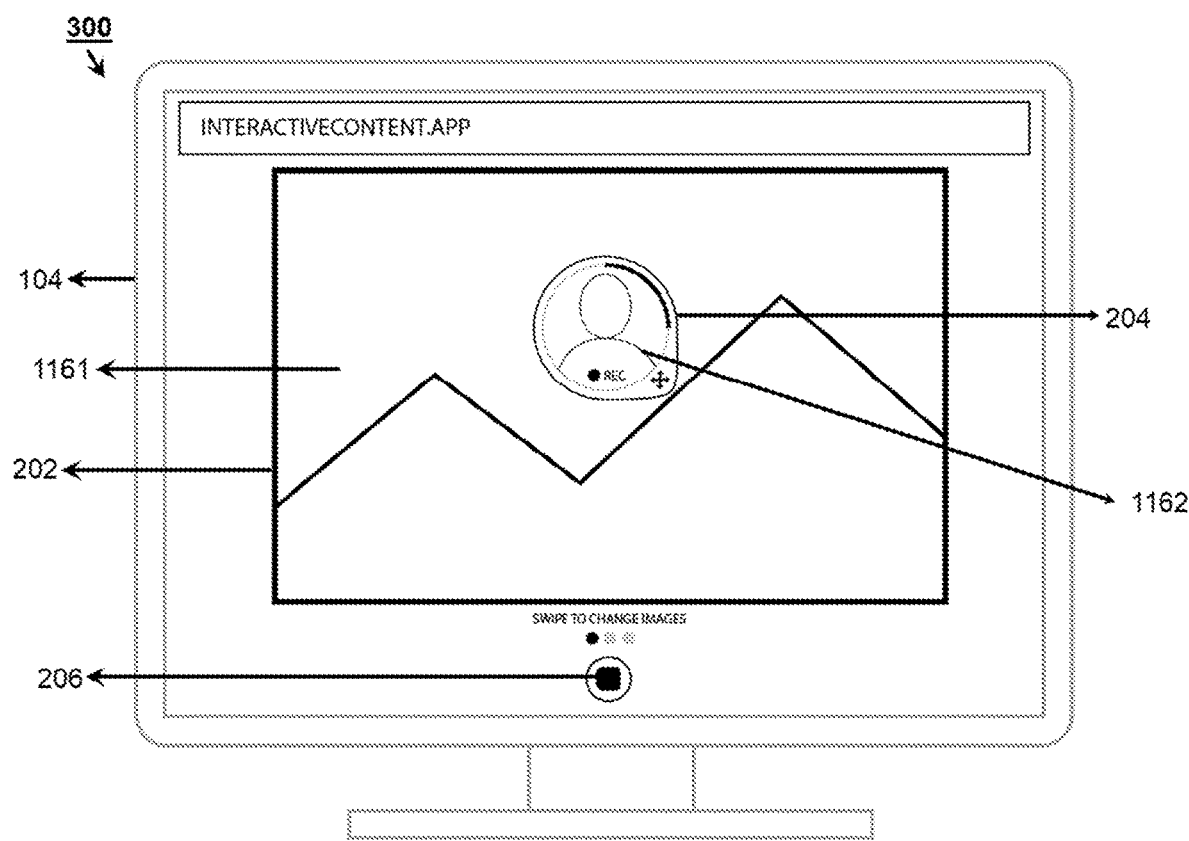

At step 1004, the one or more first user devices (104) may be configured to provide one or more second media (1162) as foreground picture-in-picture overlay and/or as segmented display by one or more first users (102). The one or more first user devices (104) may be configured to record one or more second media (1162) in one or multiple segments and relay live as foreground picture-in-picture overlay by one or more first users (102). FIG. 4A and FIG. 4B illustrates the first user devices (104) with the second media (1162), in accordance with an embodiment of the present invention. As shown in 4A and FIG. 4B, the one or more first user devices (104) may be configured to add one or more second media (1162) in one or multiple segments from local or remote media library and relay/play as foreground picture-in-picture overlay by one or more first users (102). The second media (1162) may be added in the second media holder (204) as shown in FIG. 4A and FIG. 4B.

In one embodiment of the present invention, as shown in FIG. 4A, the first media (1161) and the second media (1162) may be added to the first media holder (202) and the second media holder (204) respectively, using a smart phone. Further, in another embodiment of the present invention, as shown in FIG. 4B, the first media (1161) and the second media (1162) may be added to the first media holder (202) and the second media holder (204) respectively, using a desktop or laptop.

Figure 5:
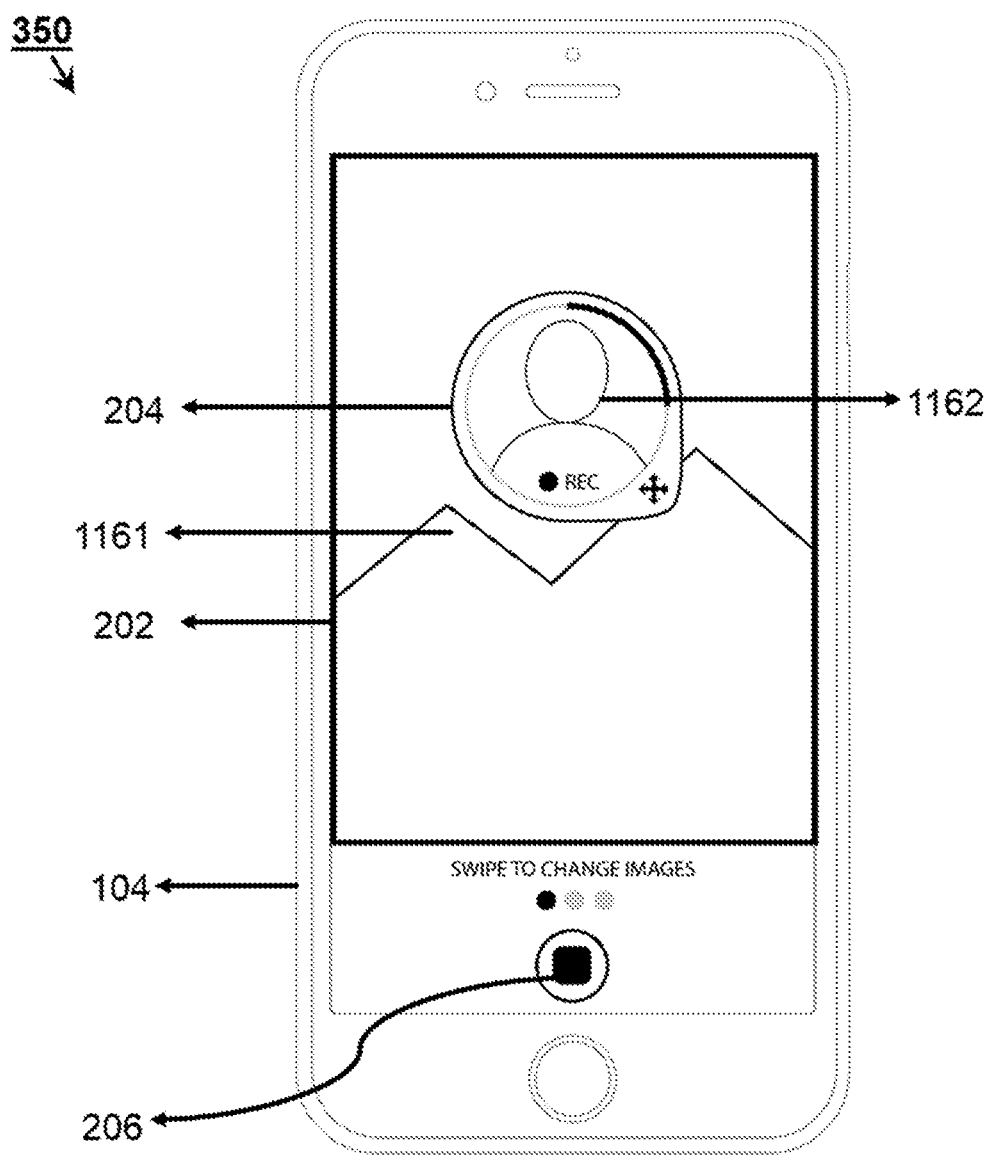
FIG. 5 illustrates an exemplary embodiment of the first user device, in accordance with an embodiment of the present invention.

FIG. 5 illustrates an exemplary embodiment of the first user device (104), in accordance with an embodiment of the present invention. As shown in FIG. 5, the first media (1161) is being displayed in the background in the first media holder (202) in the first user device (104). Accordingly, the second media (1162) is being displayed in the second media holder (204). Further, for the purpose of playing either or both of the first media (1161) and the second media (1162), the first user may interact with the preview button (206) of the media recorder (206).

At step 1006, the one or more first user devices (104) may be configured to capture a plurality of first media (1161) slides navigation changes and/or screen pointer movements and/or screen marker animation in sync with second media (1162) timeline as an interactivity data (1163) and/or cue points as per the first user's (102) haptic interaction.

The one or more first user devices (104) may be configured to capture the plurality of first media (1161) slides navigation changes and/or screen pointer movements and/or screen marker animation in sync with second media (1162) timeline as an interactivity data (1163) and/or cue points through an interactivity recorder as per the one or more first user's (102) haptic interaction with the first media holder (202) and/or the plurality of first media (1161) slides while recording one or more second media (1162) or playing one or more second media (1162) in the second media holder (204).

Further, as shown in FIG. 4A and FIG. 4B, the second media holder (204) is an interactive user interface to live relay video from one or more first user devices (104) camera or live relay of video or audio being recorded by media recorder (206) as one or more second media (1162).

Further, the haptic interaction with first media holder (202) changes the plurality of first media (1161) slides in display from sequence of the plurality of first media (1161) slides. The haptic interaction are touch screen gestures or interactions with input devices or haptic contact with touch controller to identify haptic contact engagement or click or screen pointer events or touch screen gestures like swipe right, swipe left, tap, double tap between first user (102) or second user (114) with first user device (104) or second user (114) device (112) respectively.

Figure 6A:
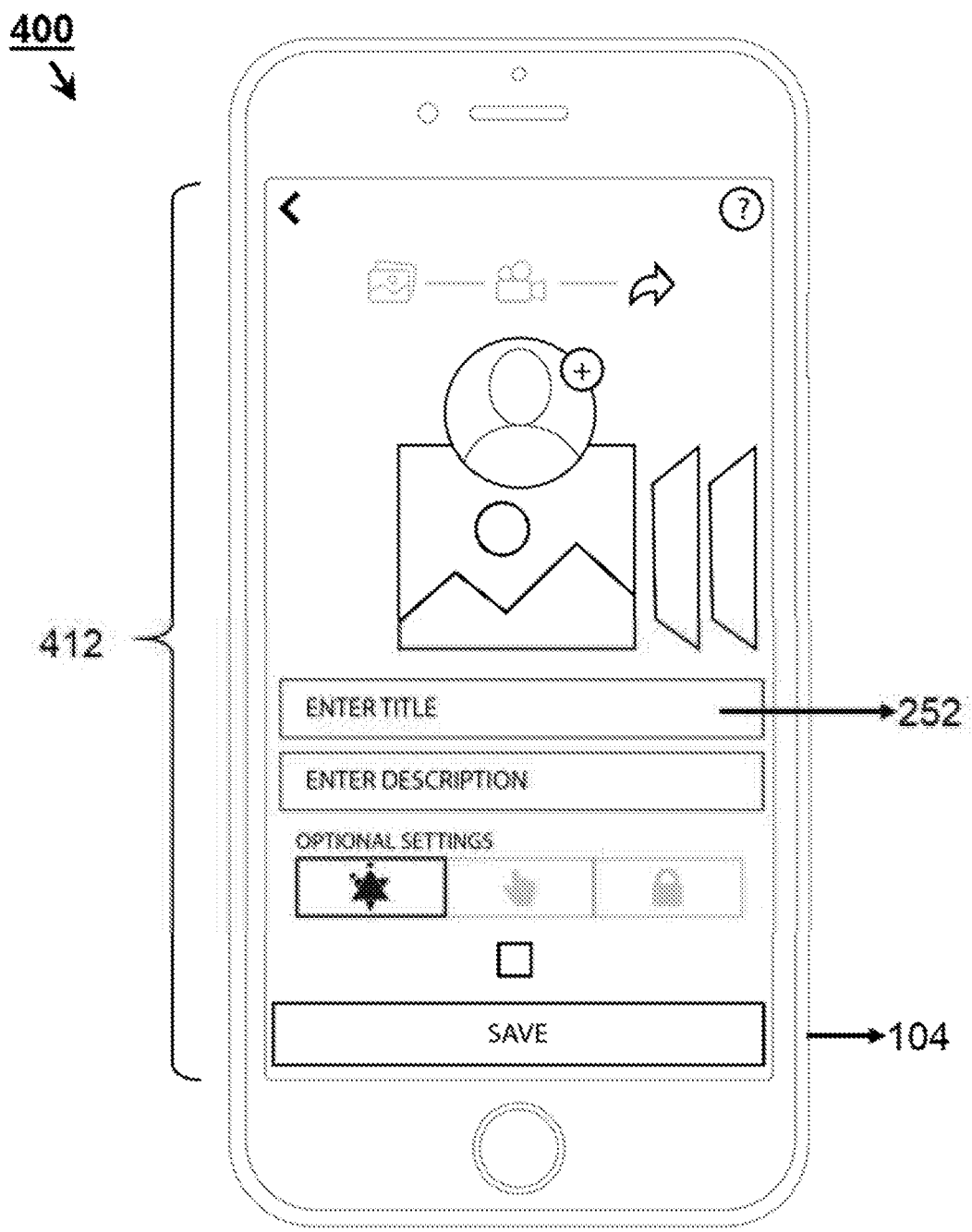
FIG. 6A illustrates a user interface displaying interactive content settings, in accordance with an embodiment of the present invention.

Further, the one or more first user devices (104) may be configured to load and display configuration interface (412) associated interactive content settings (1164) from the interactive content module (116) as shown in FIG. 6A. The one or more first user devices (104) may be configured to load associated first media (1161) and second media (1162) from the interactive content module (116). The one or more first user devices (104) may be configured to load associated interactivity data and/or cue points. Further, the second media holder (204) is configured to live relay, play and render the one or more second media (1162).

Further, the authoring module (106) is configured to load one or more first media (1161) in the first media holder and load one or more second media (1162) in the second media holder (204). Further, the second media holder (204) is further configured to play and preview recorded one or more second media (1162). Further, the second media holder (204) is further configured to play and preview recorded one or more second media (1162).

IN accordance with an embodiment of the present invention, in addition, the first media holder (202) is further configured to load and render the one or more first media (1161) as a plurality of first media (1161) slides. Additionally, the first media holder (202) is further configured to play the plurality of first media (1161) slides one after another as per the interactivity data (1163) and/or second media (1162) cue points in sync with one or more second media (1162) timeline while playing in the second media holder (204).

In accordance with an embodiment of the present invention, the interactivity recorder may be configured to capture and store interactivity data and/or second media (1162) cue points as per one or more first user's (102) haptic interaction to change one of the plurality of first media (1161) slides, screen pointer movements and screen marker animation while recording the one or more second media (1162). Further, the interactive content player (110) is configured to load the interactivity data and/or second media (1162) cue points from the interactive content module (116). Further, at step 1008, the one or more first user devices (104) may be configured to store one or more first media (1161), one or more second media (1162), with or without cue points, and/or an interactivity data (1163) as an interactive content as network-based resource. Further, whilst storing, the one or more first user devices (104) may be further configured to transcode and/or encode and/or process one or more first media (1161), one or more second media (1162), in multiple media formats and resolutions and storing as an interactive content as network-based resource.

Figure 6B:
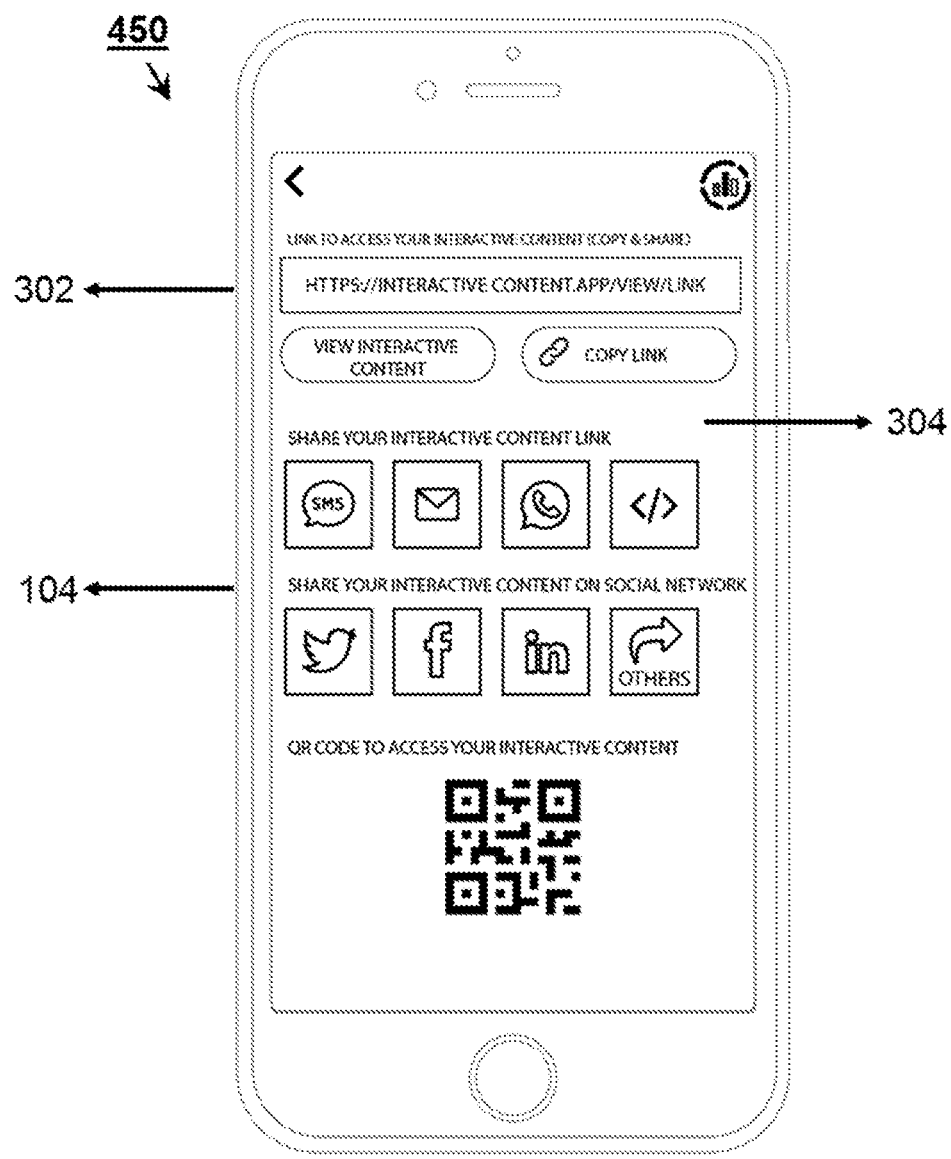
FIG. 6B illustrates User interface and URL generation in accordance with an embodiment of the present invention; and FIG. 7A

Further, in this step, as shown in FIG. 6A, the one or more first user devices (104) may be further configured to configure plurality of interactive content settings (1164) through configuration interface (412). The one or more first user devices (104) may be further configured to store the interactive content settings (1164) in the interactive content module along with associated interactive content as network-based resource. Moreover, in this step, as shown in FIG. 6B, the interactive content module (116) may be configured to generate the interactive content access URL (302). Further, the one or more first user devices (104) may be configured to receive the interactive content access URL (302) by one or more first users (102).

At step 1010, as shown in FIG. 6B, the one or more first user devices (104) may be configured to share interactive content (1165) with one or more second users (114) to access on their one or more second user devices (112); Sharing (1010) the interactive content (1165) URL by one or more first users (102) with one or more second users (114) on their one or more second user devices (112). Further, as shown in FIG. 6B, the one or more first user devices (104) may be configured to post the interactive content URL(302) on any online platform and/or sharing over network-based communication platform or apps. The one or more second user devices (112) are configured to receive and access the interactive content (1165) URL to load, render and play interactive content (1165) within interactive content player (110). At step 1012, the first media container (402) may be configured to load associated one or more first media (1161) as plurality of first media (1161) slides in the background and one or more second media (1162) as foreground picture-in-picture overlay. FIG. 7A and FIG. 7B illustrates an exemplary embodiment of the second user device (112), in accordance with an embodiment of the present invention. As shown in figure7A and FIG. 7B,the first media container (402) is configured to load plurality of the one or more first media (1161), created by one or more first users (102) by using one or more first user devices (104), as plurality of first media (1161) slides in the background displaying one of the plurality of first media (1161) slides at a time. As shown in figure7A and FIG. 7B, the first media container (402) is further configured to shuffle and display or play the plurality of first media (1161) slides one after another as per the interactivity data (1163) and/or second media (1162) cue points in sync with one or more second media (1162) timeline while playing in the second media container (404). As shown in FIG. 7A and FIG. 7B, the second media container (404) is an interactive user interface to play and render one or more second media (1162) associated with the interactive content (1165). Further, the first media container (402) is the interactive user interface to load one or more first media (1161) as the plurality of first media (1161) slides associated with the interactive content (1165). The first media container (402) render or display one or more of the plurality of first media (1161) slides in one or more second user devices (112).

In accordance with an embodiment of the present invention, the interactive content module (116) may be configured to store the interactive content settings (1164) and the interactive content (1165) as network-based resources, generate and publish an URL for the stored interactive content (1165) as interactive content (1165) URL to access them through the communication network (118). The configuration interface (412), is configured to configure the interactive content settings (1164) for every interactive content (1165). Furthermore, configuring interactive content settings (1164) includes configuring call-to-action (408) button, as shown in FIG. 7A, to enable second user (114) to access external web URL or share content or open and access another application or enable telephone call or network-based communication or text chat or video and audio call with one or more first user (102) or other customer service professional or third party individual.

At step 1014, the interactive content player (110) may be configured to render and play one or more second media (1162) and dynamically changing, displaying relevant first media (1161) slide from plurality of first media (1161) slides as per cue points and/or interactivity data in sync with second media (1162) timeline. The interactive content player (110), as shown in FIG. 7A and FIG. 7B, may be configured to display a call-to-action user interface of the associated interactive content (1165) within the interactive content player (110) or one on more second user devices (112).

Further, as shown in FIG. 7A and FIG. 7B, the interactive content player (110) may be configured to access the call-to-action user interface through the second user's (114) haptic interaction to trigger the associated configured action to access external web URL or open and access another application or to view an online payment page or online order placement page or e-commerce product listing page or enable telephone call or network-based communication or text chat or video and audio call with one or more first user (102) or other customer service professional or third party individual.

Further, as shown in FIG. 7A and FIG. 7B, interactive content player (110) may be configured to interact and select one of the plurality of first media (1161) slides from the plurality of first media (1161) slides through the second user's (114) haptic interaction. Moreover, interactive content player (110) may be configured to play the one or more second media (1162) from a particular time duration associated with the selected first media (1161) as per interactivity data (1163) and/or cue points. In accordance with an embodiment of the present invention, as shown in FIG. 7A and FIG. 7B, the second media container (404) is configured to load and play the one or more second media (1162), created by one or more first users (102) by using one or more first user devices (104), as foreground picture-in-picture overlay on top of the first media container (402).

In accordance with an embodiment of the present invention, the interactive content player (110) is configured to load the interactive content (1165) accessed through the interactive content URL from the interactive content module (116). Further, the interactive content player (110) is configured to load associated interactive content settings (1164) to display information and enable the call-to-action user interface. As shown in FIG. 7A and FIG. 7B, the interactive content player (110) displays one or more first user's (102) profile picture or display picture of a particular interactive content (1165) or custom display picture provided through interactive content (1165) URL query string parameters.

Further, the one or more second user devices (112) configured to access the interactive content (1165) URL by one or more second users (114) on their one or more second user devices (112). The one or more second user devices (112) may load interactive content (1165) in an interactive content player (110) in the one or more second user devices (112).

In accordance with an embodiment of the present invention, as shown in FIG. 7A and FIG. 7B, the one or more second user devices (112) configured to allow second user (114) to interact with the interactive timeline's (410) navigate user interface (406) to select one of the plurality of first media (1161) slides to display from sequence of the plurality of first media (1161) slides and play one or more second media (1162) from the specific time duration associated with selected one of the plurality of first media (1161) slides as per interactivity data (1163) and/or one or more second media (1162) cue points. Further, the interactive timeline interface (410) is configured to display second media (1162) timeline dynamically on one or more second user devices (112) for second user's (114) interaction.

Further, one or more second user devices (112) configured to allow second user's (114) haptic interaction with first media container (402) to select one of the plurality of first media (1161) slides to display from sequence of the plurality of first media (1161) slides and play one or more second media (1162) from the specific time duration associated with selected one of the plurality of first media (1161) slides as per interactivity data (1163) and/or one or more second media (1162) cue points.

In addition, one or more second user devices (112) configured to allow second user's (114) haptic interaction with one or more call-to-action (408) button to access and view the associated content or external web URL or open and access another application or enable telephone call or network-based communication or text chat or video and audio call with one or more first user (102) or other customer service professional or third party individual.

In accordance with an embodiment of the present invention, the one or more second user devices (112) are configured to access the interactive content (1165) URL through the communication network (118) to load, play and render interactive content (1165) within an interactive content player (110) of the player module (108). Further, one or more second user devices (112) configured to allow second users (114) to Interact with the interactive content (1165) through the interactive timeline (410) of the interactive content player (110) to choose and play different time duration of one or more second media (1162) and displaying associated first media (1161) within first media container (402) as per interactivity data (1163) and/or second media (1162) cue points.

In one embodiment of the present invention, as shown in FIG. 7A and FIG. 7B, the interactive timelines (410) interface may further comprise a navigate user interface (406) to change the one of the plurality of first media (1161) slides in display from sequence of the plurality of first media (1161) slides. The interactive content player (110) may be further configured to animate screen pointers, draw and render screen markers over respective one of the plurality of first media (1161) slides in sync with second media (1162) timeline as per interactivity data (1163) and/or one or more second media (1162) cue points.

Figure 8:
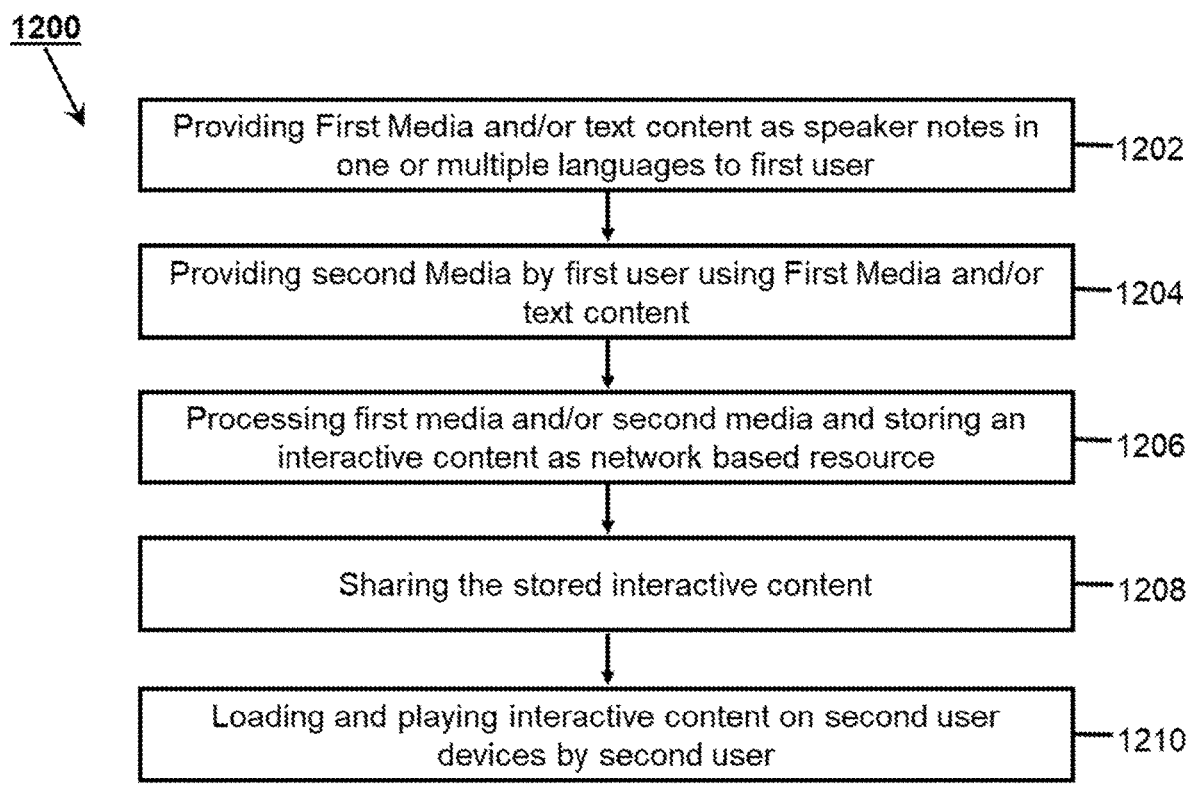
FIG. 8 illustrates a method for creating, sharing and viewing interactive content, in accordance with an embodiment of the present invention.

FIG. 8 illustrates a method (1200) for creating, sharing and viewing interactive content (1165). As shown on FIG. 8, at step 1202, the one or more first media (1161) and/or text content is provided as speaker notes in one or multiple languages to the first user (102), in accordance with an embodiment of the present invention. In an aspect, the one or more first media (1161) is images, photos, videos, audio, videos with audio, text, text animations, animated graphics, interactive animation, interactive poll questions, and the like.

At step 1204, the second media (1162) is provided by the first user (102) using first Media (1161) and/or text content. In an aspect, the one or more second media (1162) is video, video with audio, audio only. In an embodiment, the second media (1162) is provided by the first user (102) by recording second media (1162) using first media (1161) and/or text content. In another embodiment, the second media (1162) is provided by the first user (102) by recording second media (1162) using first media (1161) and/or text content as voice narration script.

At step 1206, the first media (1161) and/or second media (1162) are processed for generating interactive content (1165). The interactive content (1165) is then stored as a network based resource. In an embodiment, the step of processing the first media (1161) and/or second media (1162) comprises transcoding and/or encoding and/or processing the first media (1161) and/or the second media (1162), in multiple media formats and resolutions. In another embodiment, the step of processing the first media (1161) and/or second media (1162) comprises combining or merging both first media (1161) and second media (1162). A call-to-action button (408) may further be added within interactive content (1165) with hyperlink to any online resource or web content or application. The step of processing the first media (1161) and/or second media (1162) may further comprise generating the interactive content (1165) access URL and receiving the interactive content (1165) access URL by first users (102).

At step 1208, the stored interactive content (1165) is shared. In an embodiment, the interactive content (1165) is shared by posting the Interactive content (1165) and/or interactive content (1165) URL on any online platform and/or sharing over network-based communication platform or apps. In another embodiment, the Interactive content (1165) may be shared with the second user (114) on second user devices (112). The interactive content (1165) shared with the second user (114) on second user devices (112) may further be loaded and played on the second user devices (112) by second user(114), at further step 1210. The Interactive content (1165) may be loaded and played on the second user devices (112) by displaying a call-to-action button (408) of the associated interactive content (1165) on the second user devices (112). The call-to-action button (408) may be accessed through the second user's (114) haptic interaction to trigger the associated configured action to access external web URL or open and access another application or to view an online payment page or online order placement page or e-commerce product listing page or enable telephone call or network-based communication or text chat or video and audio call with one or more first user (102) or other customer service professional or third party individual.

Illustrative example: Embodiments of the present invention provides a method for creating and sharing interactive content rapidly anywhere and anytime. The proposed system and method enable users to rapidly/instantly create multimedia based interactive content presentation by showing images/visual content as first media in the background and telling/explaining about them using audio or video recording as second media as an overlay foreground in an insert movable window, then save & sharing the content with target audience through any online platform or communication medium. The recipient can view the interactive content on any device and anytime (on-demand). This will address the problem of people not reading text description or text messages/email. Using this invention one can rapidly/ instantly create an interactive content and share with their target audience instead of sharing text based communication like email/messages. Target recipient just need to watch/hear received interactive content. This is a best alternative replacement for the traditional video production which consumes huge cost and time.

By showing an visual content/image/slide as a first media and telling/explaining about them through an video/audio notes as a second media brings clarity in communication. The invention brings maximum internet bandwidth optimisation by keeping second media video/audio content component smaller and separated from background first media content and retains best interactive user experience by using layered presentation approach both while authoring and playing the content. In other words the visual content/ images/slides of first media are placed in the background layer displaying one at a time from sequence of slides, while the description video/audio of second media being recorded is placed as an overlay foreground in a smaller movable insert window, as the user recording the interactive content user can change the background images/visual content/ slides of first media and continue explaining them while recording video/audio of second media, once they complete the recording, user can save and share the interactive content to any audience online. The invention never combines background and foreground content as a single video, it retains the foreground first media content and background second media content separately to optimise the content size and to provide superior interactive experience along with call-to-action button. When target recipient access the received interactive content, the inbuilt player loads images/ visual content/slides of first media in the background displaying one at a time from sequence of slides and the recorded video/audio description of second media as an overlay foreground in a smaller movable insert window and start playing, the background images of first media being displayed animate and change in exact time when user changed them while recording audio/video of second media. In other words the background images/slides/visual content of first media being displayed one at a time are changed from sequence of slides in sync with second media video/audio timeline. While the target audience view the interactive content, they can stop playing and interact with sequence of background visual content/images/slides of first media and select one and start playing/resuming the second media video/audio from a particular timeline related to the selected background visual content/images/slides of first media. Also while authoring the interactive content author can configure call-to-action button to open any third party web content or allow them to open any communication application or a link to take the target audience to payment page.

This enables anyone to communicate with clarity in a short span of time without spending much cost and time. This invention would address all shortfalls of below explained scenarios.

Online platforms like social commerce which enables users to become resellers by allowing them to share the product details like product images and text description of the product with their friends and families through chat and social media platforms. But sharing just images and text description is not good enough. The primary elements missing are "Educating" and "Selling". Using this invention Social commerce platform can provide authoring tools and interfaces where Resellers create and share interesting interactive content to their social contacts by showing the product images as first media and explain them about various features of the product through their own video or audio recording as second media in their natural language. They educate potential customers through this interactive content and build trust through their identity disclosed over second media video/audio recording. Also they can activate and/or configure call-to-action buttons to enable target audience to click and buy product or place order or enable network based communication with the Reseller or merchant. Thus, reseller got an amazing opportunity to build trust and confidence among their social contacts/customers and to perform better in sales.

E-commerce platform's affiliate program are based on affiliate marketing which enable any affiliates to sell the listed products through various marketing activities of their own. Providing web URL, product images and text description are NOT just good enough for the affiliates to succeed in marketing the product. Through this invention, E-commerce platform can empower affiliates by providing digital authoring tool which enables affiliates to create interactive content by showing the product images as first media and explain them through their own audio/video recording as second media to educate customers in their own language along with necessary call to action to take the potential customer to shopping order page. This would increase the chances of selling the products in multifold.

Also E-commerce platform provides product listing interface to all merchants to add photos, videos and text description of any product they would like to list and sell online. Along with this invention, these e-commerce platform can provide an authoring tool which enable merchants to create interactive content by showing the product images as first media and describe about them through video or audio recording of their own sales people as second media similar to how one would greet and explain about the product when customer visits a retail showroom. This created interactive content can be listed along with product details in the e-commerce platform. This gives superior shopping experience to the e-commerce target audience/buyers, where someone like a virtual sales person is explaining them about the product through interactive content format what they are interested. This enable maximum increase in sales conversion rate.

Professional network platforms enable users to send messages/email through text and with or without any presentation as an attachment among user contacts within the platform. Additionally using this invention these professional network platform can provide authoring tools to enable users to create and share self-made interactive content by showing their presentation slide content as first media and explaining them through their own short video or audio recording as second media and send the created interactive content as an elevator pitch presentation or short business presentation. This would enable users to improve the message access rate, response rate, build trust to succeed in social selling and communicate faster with clarity.

Customer Relationship Management (CRM) platform provides communication interfaces and options to CRM users to contact their potential customers through email, short message text, telephone call etc. The message open rate is very low as people don't prefer to read cold & long emails. Through this innovation these CRM platform can provide an intuitive authoring tool to users to create personalized interactive content to every customers by showing/displaying their presentation slides or product images as first media and describe them through quick video or audio recording as second media and share it as interactive content. This would help them to increase the content access rate among their target customers and build trust before they make purchase decision. This would enable to practise social selling principles like educate, engage and sell.

Online content generation platform like blog websites, news websites, informative websites, social media, chat application, etc provides tools to users and authors to create text article with images and text. But with the changing audience interest towards videos and preference to watch the content over reading long text articles, Through this invention, these platforms can provide new authoring tool which enables authors to rapidly create their interactive content through showing as a first media and describing them through their own video or audio recordings as a second media. This would bring a new method for rapid content creation through video or audio.

Examples of the computing device may include, but are not limited to, a personal computer, a portable computing device, a tablet, a laptop, a mobile computer, a wearable computer, a communication device such as a smartphone, and a personal digital assistant, and the like. Moreover, the computing device includes a plurality of electronic components for example, such as a microprocessor, a graphics processor unit (GPU), a memory unit, a power source and a user interface. Exemplary user interface includes one or more buttons, a gesture interface, a knob, an audio interface, and a touch-based interface, and the like.

Further, one would appreciate that the communication network (118) can be a short-range communication network (118) and/or a long-range communication network (118), wire or wireless communication network (118). The communication interface includes, but not limited to, a serial communication interface, a parallel communication interface or a combination thereof.

Exemplary relevant content may include, but not limited to, audio, graphics, video, animation, interactivity, polls, surveys, URLs, embedded media players to render media content and combination thereof.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof.

For sake of ease of explanation, following are the terminologies used throughout the Detailed Description are defined below:

The Interactive content URL may be public URL or private URL, interactive content URL also accepts URL query string parameters to enable/replace call-to-action target action with a new external URL. Also interactive content URL accepts URL query string parameters to override or replace the profile picture or display picture to be rendered in Second media container in the interactive content player for that particular session instant.

Public URL allows one or more second user to access the interactive content without any restriction.

Private URL allows one or more second user to access the interactive content after provide the valid password or account authentication associated with first user or second user.

First user is a registered or anonymous user of an online platform or e-commerce platform or social commerce platform or social selling platform or user of a social network platform or professional networking platform or online content generation platform with a profile account.

Second user is a registered or anonymous user of an online platform or e-commerce platform or social commerce platform or social selling platform or online content generation platform or social network member or professional network member associated with first user of any professional or any social network profile account.

Interactive content settings of an interactive content includes:
  Set One or more Call-to-action button to be included in interactive content with hyperlink to one or more content or external web URLs referring any network-based resources or to enable telephone interaction or network-based text chat, voip call, video call communication for second user to interact with first user or other customer service professional or another individual contact mentioned in the interactive content URL query string parameters.
  Set Password authentication to access the interactive content.
  Set Profile picture of the first user associated with first user device.
  Set Display picture associated with a particular interactive content.
  Set Interactive content title, description, search hash-tags, content classification type, pricing details, stock details, preview picture and text associated with social media sharing.

Interactivity data contains metadata of second media timeline information and which first media or First media slides to be rendered and displayed while playing Second media at different timeline interval and specific duration. It also contains sequence of data for animating the pointers, drawing and rendering screen marker as overlay on top of particular First media or First media slide while playing Second media at different timeline interval and specific duration.

Process includes Processing the plurality of First media, plurality of Second media in to different multimedia formats and resolutions, combining multiple Second media segments in to one Second media or splitting one Second media into multiple Second media, generating necessary preview information & multimedia content from plurality of First media, plurality Second media, interactivity data and interactive content settings.

Recording Second media includes recording the Second media through rear-facing camera or front-facing camera and/or microphone.

Capturing First media includes capturing the First media through rear-facing camera or front-facing camera and/or microphone.

First media is images, photos, videos, audio, videos with audio, text, text animations, animated graphics, interactive animation, interactive poll questions.

Second media is video, video with audio, audio only.

First media Holder is an interactive user interface to load plurality of First media as First media slides and render or display one or more First media slides in the first user device. It also play the slides one after another as per interactivity data and/or second media cue points in sync with Second media timeline while playing in Second media holder. Slides can also be navigated one after another through first user's haptic interaction.

Second media Holder is an interactive user interface to live relay video from first user device's camera or live relay of video being recorded by media recorder as Second media. It also play and preview recorded Second media.

First media container is an interactive user interface to load plurality of First media as First media slides associated with an interactive content stored as network-based resource and render or display one or more First media slides in the second user device. It also play the First media slides one after another as per interactivity data and/or second media cue points in sync with Second media timeline while playing in Second media container. First media Slides can also be navigated one after another through second user's haptic interaction.

Second media container is an interactive user interface to play and render one or more Second media associated with an interactive content stored as network-based resource. Also, second media container displays first user's profile picture or display picture of a particular interactive content or custom display picture provided through URL query string parameters.

Haptic interaction are touch screen gestures or interactions with input devices or haptic contact with touch controller to identify haptic contact engagement or click or screen pointer events or touch screen gestures like swipe right, swipe left, tap, double tap between first user or second user with first user device or second user device respectively.

First user device is a computing device or a smart phone or a portable device with processor, memory, user interface and display.

Second user device is a computing device or a smart phone or a portable device with processor, memory, user interface and display.

Picture-in-picture means one or more foreground content placed within a smaller insert window which is movable through haptic interaction as foreground overlay on top of one or more background content.

Insert window are round or polygonal or oval or non-polygonal in shape.

Interactive timeline allows user to pause or play an interactive content, the interactive & movable timeline knob allows the user to drag the timeline knob to choose different timeline of associated Second media and respective First media slide as per interactivity data and/or second media cue points and play.

The navigate user interface (406) allows user to select a First media slide to display from sequence of associated First media slides and play Second media from the specific time duration associated with selected First media slide as per interactivity data and/or Second media cue points.

Interactive content contains associated one or more first media, one or more second media with or without cue points, an interactivity data, associated interactive content settings as data.

Second media cue points is a metadata of second media timeline information and which first media or First media slides to be rendered and displayed while playing Second media at different timeline interval and specific duration. It also contains sequence of data for animating the pointers, drawing and rendering screen marker as overlay on top of particular First media or First media slide while playing Second media at different timeline interval and specific duration.

Various modifications to these embodiments are apparent to those skilled in the art from the description. The principles associated with the various embodiments described herein may be applied to other embodiments. Therefore, the description is not intended to be limited to the embodiments but is to be providing broadest scope consistent with the principles and the novel and inventive features disclosed or suggested herein. Accordingly, the invention is anticipated to hold on to all other such alternatives, modifications, and variations that fall within the scope of the present invention and the appended claims.

The invention claimed is:

1. A computer-implemented method (1200) for creating and sharing Interactive content (1165), the method (1200) comprising the steps of:
  providing (1202) First Media (1161) and/or text content as speaker notes in one or multiple languages to first user (102) in a first user device (104);
  providing (1204) second Media (1162) by first user (102) using First Media (1161), and/or text content by using first user device (104);
  processing (1206) first media (1161) and/or second media (1162) and storing an interactive content (1165) as network based resource;
  transcoding and/or encoding and/or processing first media (1161) and/or second media (1162), in multiple media formats and resolutions;
  sharing (1208) the stored interactive content (1165) by using first user device (104) with second user (114);
  loading and playing (1210) interactive content (1165) on second user devices (112) by second user(114);
  wherein the first user device (104) associated with the first user (102) having at least a processor, memory, display, media library stored locally or in remote location associated with the first user's (102) account.

2. The method (1200) as claimed in claim 1, wherein the step of Providing (1204) further comprises the step of recording second media (1162) by first user (102) using First Media (1161) and/or text content.

3. The method (1200) as claimed in claim 1, wherein the step of Providing (1204) further comprises the step of recording second media (1162) by first user (102) using First Media(1161) and/or text content as voice narration script.

4. The method (1200) as claimed in claim 1, wherein the step of Processing (1206) further comprises the step of adding a call-to-action button (408) within interactive content (1165) with hyperlink to any online resource or web content or application.

5. The method (1200) as claimed in claim 1, wherein the step of Processing (1206) further comprises the step of combining or merging both first media (1161) and second media (1162).

6. The method (1200) as claimed in claim 1, wherein the step of Processing (1206) further comprising the steps of:
  generating the interactive content (1165) access URL; and
  receiving the interactive content (1165) access URL by first users (102).

7. The method (1200) as claimed in claim 1, wherein the step of sharing (1208) further comprises the step of posting the Interactive content (1165) and/or interactive content (1165) URL on any online platform and/or sharing over network-based communication platform or apps.

8. The method (1200) as claimed in claim 1, wherein the step of sharing (1208) further comprises the step of sharing Interactive content (1165) with second user(114).

9. The method (1200) as claimed in claim 1, wherein first media (1161) is images, photos, videos, audio, videos with audio, text, text animations, animated graphics, interactive animation, interactive poll questions.

10. The method (1200) as claimed in claim 1, wherein second media (1162) is video, video with audio, audio only.

11. The method (1200) as claimed in claim 1, wherein the step of loading and playing (1210) further comprising the steps of:
  displaying a call-to-action button (408) of the associated interactive content (1165) on second user devices (112); and
  accessing the call-to-action button (408) through the second user's (114) haptic interaction to trigger the associated configured action to access external web URL or open and access another application or to view an online payment page or online order placement page or e-commerce product listing page or enable telephone call or network-based communication or text chat or video and audio call with one or more first user (102) or other customer service professional or third party individual.

* * * * *